May 3, 1966  G. M. MOONEY  3,248,782
METHOD OF MAKING A ONE PIECE INTEGRAL/COMPOSITE GEAR
Filed Jan. 14, 1963  2 Sheets-Sheet 1

INVENTOR
GEORGE M. MOONEY
BY Moore, White & Burd
ATTORNEYS

May 3, 1966          G. M. MOONEY          3,248,782

METHOD OF MAKING A ONE PIECE INTEGRAL/COMPOSITE GEAR

Filed Jan. 14, 1963          2 Sheets-Sheet 2

INVENTOR.
GEORGE M. MOONEY
BY
ATTORNEYS

United States Patent Office 3,248,782
Patented May 3, 1966

3,248,782
METHOD OF MAKING A ONE PIECE
INTEGRAL/COMPOSITE GEAR
George M. Mooney, St. Paul, Minn., assignor to Capitol
Gears Inc., St. Paul, Minn., a corporation of Minnesota
Filed Jan. 14, 1963, Ser. No. 251,168
2 Claims. (Cl. 29—159.2)

This invention relates to an integral/composite polyfunctional toothed working part, such as a gear, and the method of making the same. More particularly, this invention relates to an integral composite polyfunctional working part, such as a gear, having at least two separate operating concentric toothed annular faces, which are separate and spaced apart or offset with respect to one another. For convenience, the invention is described and illustrated with specific reference to a combination bevel gear and clutch of a type useful in reverse gear mechanisms.

The invention is illustrated with reference to the drawings in which like numerals refer to corresponding parts and in which.

Figure 1:
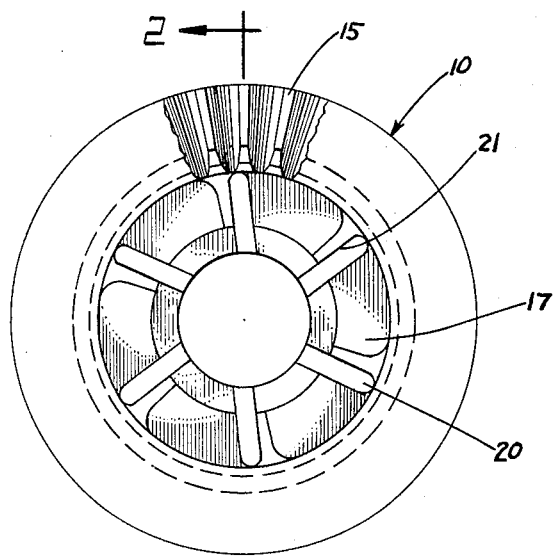
FIGURE 1 is a plan view of an integral bevel gear and clutch according to the present invention.

Referring to the drawings, the one-piece integral composite gear and clutch, indicated generally at 10, includes a hub 11 by means of which the integral structure is mounted in bearings or fitted to the end of a shaft. Radial holes 12 in the hub are provided to hold the work piece in a jig during cutting of the teeth. The end of the jig shaft may bottom on an annular shoulder 14. The face of the integral gear and clutch is provided with an annular ring of a plurality of radiating beveled gear teeth 15 by milling in the conventional manner.

Figure 2:
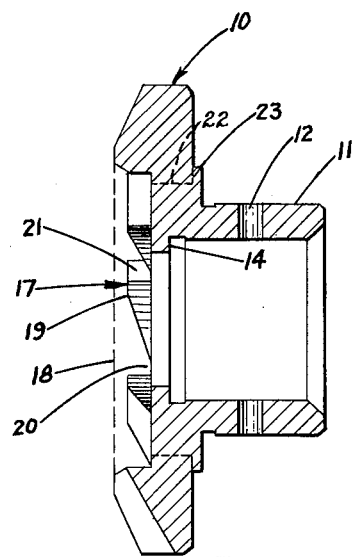
FIGURE 2 is a section on the line 2—2 of FIGURE 1 and in the direction of the arrows.

The clutch portion of the integral composite structure includes a plurality of tapered arcuate ratchet teeth 17 disposed in an annular array concentric with and within the inner periphery of the bevel gear and recessed or spaced from the plane generated by the topmost surfaces of the bevel gear teeth. This is clearly apparent in FIGURE 2. The plane of the highest surfaces of the bevel gear teeth is there indicated by the broken line designated by numeral 18.

Each ratchet tooth face of the clutch is in the form of an arcuate sloping surface extending from a peak or crown or ridge 19 to a valley or channel 20. The engaging face 21 of each ratchet tooth lies generally along a radial plane extending through the longitudinal center line or axis of rotation of the composite unit. However, as more clearly seen in FIGURE 5, the engaging face 21 is preferably provided with a slight convexity to form a small crown. The outer peripheral edge of each ratchet tooth abuts against and is integral with the inner periphery of the bevel gear. This contributes to the added strength of the composite unit.

Combination gears and clutches of the type described have been known heretofore. However, because of fabrication problems these prior units have always been made as separate parts and then secured together in some convenient manner. For example, the ratchet and bevel gear were separately formed, and then brazed together; or the ratchet was first formed and a bevel gear blank was then brazed to it, and, thereafter, the gear teeth were generated. In such two piece construction the bevel gear and ratchet were brazed generally along the broken line indicated at 22 in FIGURE 2, the bevel gear being supported on shoulder 23 of the ratchet.

The reason why this means of fabrication was necessary is that it was not possible to cut the ratchet teeth by existing tooth cutting means because of the offset recessed or depressed relationship between the ratchet teeth of the clutch and the teeth of the bevel gear. In other words, the area of the work blank in which the ratchet teeth were to be formed was inaccessible by ordinary tooth cutting means utilizing revolving disc or wheel type cutters. By forming the parts separately no such problem existed. The ratchet teeth of the clutch, when separated from the bevel gear, were formed in the conventional manner by conventional tooth cutting means.

For many years the two part brazed structures were satisfactory in service. However, with increasing horsepower the composite gears and clutches are subjected to greater forces, with the result that shearing occurred at the site of the braze between the gear and clutch. Previous attempts to strengthen the composite gear and clutch structure have not been successful.

Thereupon, the integral composite gear and clutch according to the present invention was conceived but such structure was impossible of manufacture by existing tooth cutting means because of the inaccessability of the work piece by the cutting tool in the area of the ratchet teeth. Accordingly, the method as illustrated in FIGURES 3 and 4 was conceived as a means of overcoming the seemingly insurmountable fabrication problem.

According to that method, the work piece is machined to outline shape from steel bar stock of appropriate quality and strength. The resulting work piece is held in a suitable jig at an angle with respect to a cutting tool 25 corresponding to the desired slope of the face surface of the ratchet teeth. The end cutting face of the tool 25 is brought into contact with the work piece and cuts the ratchet tooth surface by a combination of the relative rotational movement of the cutter about its own axis and rotational movement of the work piece about its own axis through an arc dependent upon the desired number of ratchet teeth.

The channel or valley 20 between adjacent ratchet teeth and the engaging face 21 of each ratchet tooth is formed by another side milling cutter 27 having cutting faces at its edges. Cutter 27 is positioned relative to the work piece so that the axis of rotation of that cutter varies from generally parallel to the axis of rotation of the finished integral gear and clutch to about 8° or so away from the axis of rotation of the finished part. Cutter 27 and the work piece move relative to one another along a path lying generally along a radius of the work piece. However, as shown in FIGURE 4, cutter 27 and the work piece preferably move relative to one another along a very slightly arcuate path to produce the desired crown on the engaging face 21. Each cutting operation is repeated to complete the required number of ratchet teeth. The edge between ratchet tooth ridge 19 and engaging face 21 is preferably chamfered. Because the bevel gear teeth 15 are out in an exposed accessible portion of the work piece, the bevel gear teeth are produced by conventional tooth cutting means in the conventional manner. The bevel gear teeth may be generated before or after the ratchet teeth, but preferably afterward.

Figure 3:
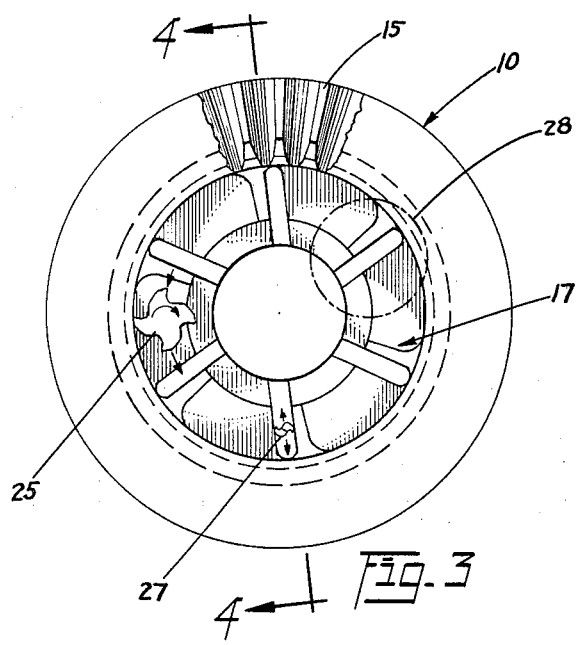
FIGURE 3 is a plan view of the working face of an integral bevel gear and clutch showing diagrammatically the manner in which the ratchet teeth of the clutch plate are formed.
Figure 4:
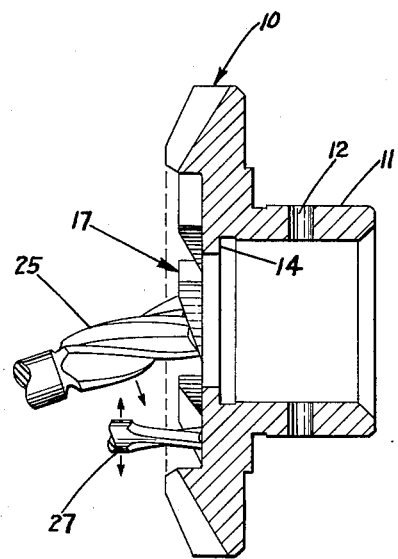
FIGURE 4 is a section on the line 4—4 of FIGURE 3 and in the direction of the arrows.
Figure 5:
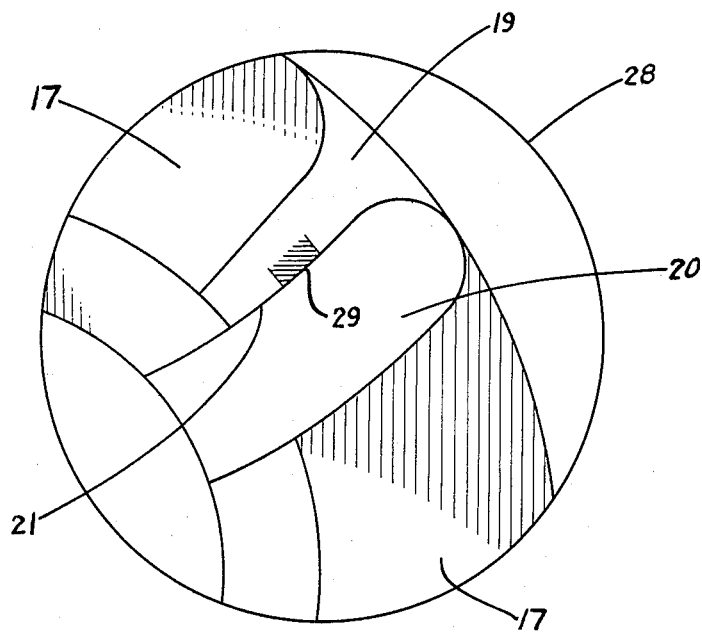
FIGURE 5 is a partial plan view on an enlarged scale of a portion of the working face of the clutch to show details.

In FIGURE 5 there is shown on an enlarged scale the portion of the plan view of FIGURE 3 included within broken line circle 28 in order to show more precisely the preferred construction of the ratchet tooth engaging faces 21. In order to concentrate the load of the force exerted upon the clutch teeth by an engaging clutch dog in the center of the teeth it is desirable that the engaging faces of the teeth be provided with a slight convex crown. In order to produce such a crown according to the specifications of the designer of the mechanism in which the gear and clutch is used, cutter 27 is moved relative to the work piece along an arcuate path of large radius. This produces the very slight convex curvature of the engaging face 21 as shown in the enlarged detail view of FIGURE 5. As an example of design specifications in this regard, one requirement is that the surface of the engaging face 21 of the ratchet tooth have a crown of 0.002 inch in a 5/16 inch length and that the crown be centered in the shaded zone 29. Obviously the height of the crown can be varied to meet specific requirements. Similarly, the degree of inclination of the engaging faces of the ratchet teeth from the radial plane extending through the longitudinal center line of the integral gear and clutch may be varied to meet design specifications. In the example given, the engaging face 21 is inclined 5° inwardly from the edge with ridge 19.

Although the invention is described and illustrated by specific reference to a combined bevel gear and clutch, it will be apparent that the principles are applicable to any composite integral toothed structure in which the toothed engaging faces are offset or displaced with respect to one another such that one set of teeth are in a location which is inaccessible by conventional tooth cutting means. The invention is obviously not limited to any particular size or shape or arrangement of gear teeth, or for a working part for the purpose of performing any specific function or a working part for use in any particular mechanism.

It is apparent that many modifications and variations of this invention as hereinbefore set forth may be made without departing from the spirit and scope thereof. The specific embodiments described are given by way of example only and the invention is limited only by the terms of the appended claims.

I claim:
1. A method of making a one piece integral/composite polyfunctional toothed working part adapted for rotation about an axis and having at least two concentric annular rings of teeth disposed about that axis, one of said rings of teeth being unobstructed by any portion of said working part and another of said rings of teeth being recessed with respect to said first ring of teeth, said method comprising forming a work piece by machining metal stock to outline shape, cutting said recessed teeth by rotating a rotatable cutting tool having an end cutting face in contact with the blank work piece and moving said work piece relative to the end cutting tool in one direction and rotating a rotatable cutting tool having side edge cutting faces in contact with said work piece and moving said work piece relative to the side cutting tool in another direction to delineate said teeth, and cutting said unobstructed teeth by revolving edge cutters of a gear cutter in contact with the blank work piece and moving said work piece relative to the gear cutter to delineate said teeth.

2. A method of making a one piece integral/composite gear and clutch adapted for rotation about an axis, said gear and clutch including an unobstructed annular ring of a plurality of generally radial gear teeth disposed about the axis of rotation and an annular ring of a plurality of arcuate sloping ratchet teeth concentric with and within the inner periphery of said ring of gear teeth, said ratchet teeth being recessed relative to said gear teeth and each of said ratchet teeth having a generally radial engaging face; said method comprising forming a blank work piece by machining metal stock to outline shape, cutting the sloping faces of said recessed ratchet teeth by rotating a rotatable cutting tool having an end cutting face in contact with the blank work piece and moving said work piece relative to the end cutting tool generally about the axis of the work piece to delineate the sloping faces of the ratchet teeth, cutting the generally radial engaging faces of said recessed ratchet teeth by rotating a rotatable cutting tool having side edge cutting faces in contact with the blank work piece and moving the work piece relative to the side cutting tool generally radially to delineate the spaces between adjacent teeth, and cutting said unobstructed radial gear teeth by revolving edge cutters of a gear cutter in contact with the blank work piece and moving said work piece generally radially relative to the gear cutter to delineate said radial gear teeth.

References Cited by the Examiner

UNITED STATES PATENTS

| | | | |
|---|---|---|---|
| 840,055 | 1/1907 | Ferguson | 74—333 |
| 1,859,171 | 5/1932 | Riley | 74—333 |
| 2,062,927 | 12/1936 | Peterson | 29—159.2 |
| 3,100,333 | 8/1963 | Friend | 29—159.2 |

JOHN F. CAMPBELL, *Primary Examiner.*

DON A. WAITE, *Examiner.*

THOMAS H. EAGER, L. H. GERIN,
*Assistant Examiners.*